(12) United States Patent
Shimoda et al.

(10) Patent No.: US 8,657,257 B2
(45) Date of Patent: Feb. 25, 2014

(54) GATE VALVE

(75) Inventors: Hiromi Shimoda, Tsukubamirai (JP);
Hiroshi Ogawa, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 26 days.

(21) Appl. No.: 13/445,006

(22) Filed: Apr. 12, 2012

(65) Prior Publication Data

US 2012/0267556 A1    Oct. 25, 2012

(30) Foreign Application Priority Data

Apr. 21, 2011    (JP) ................... 2011-095450

(51) Int. Cl.
*F16K 3/00*    (2006.01)
(52) U.S. Cl.
USPC ........... 251/329; 251/326; 251/193; 251/300; 251/301
(58) Field of Classification Search
USPC .......................... 251/193, 326, 329, 300–303
See application file for complete search history.

(56) References Cited

U.S. PATENT DOCUMENTS

| | | | | | |
|---|---|---|---|---|---|
| 3,601,359 | A | * | 8/1971 | Scaramucci | 251/148 |
| 3,963,214 | A | * | 6/1976 | Hackman et al. | 251/326 |
| 7,100,892 | B2 | * | 9/2006 | Iwabuchi | 251/187 |
| 7,134,642 | B2 | * | 11/2006 | Seitz | 251/193 |
| 7,234,679 | B2 | * | 6/2007 | Ishigaki | 251/116 |
| 2011/0089354 | A1 | | 4/2011 | Nagao et al. | |

FOREIGN PATENT DOCUMENTS

| | | |
|---|---|---|
| JP | 2002-195424 | 7/2002 |
| JP | 2005-291221 | 10/2005 |

* cited by examiner

*Primary Examiner* — John K Fristoe, Jr.
*Assistant Examiner* — Marina Tietjen
(74) *Attorney, Agent, or Firm* — Oblon, Spivak, McClelland, Maier & Neustadt, L.L.P.

(57) ABSTRACT

In a gate valve including a valve plate connected to a valve plate mounting portion of at a tip end of a valve rod with a connecting plate and configured to open and close a communicating hole of a valve box with the valve plate, the valve plate includes a mounting hole, a joint flat surfaces coming into press-contact with each other, the valve rod includes a depressed-shaped joint shoulder portion, the joint shoulder portion is formed with an inclined surface configured to guide the valve plate in the direction in which the joint flat surfaces are brought into press-contact with each other, and the coupling plate couples the valve plate and the valve rod with each other.

16 Claims, 4 Drawing Sheets

GATE VALVE

BACKGROUND OF THE INVENTION

[1] Field of the Invention

The present invention relates to a gate valve connected to a processing chamber of a semiconductor manufacturing apparatus or the like to open and close a communicating channel communicating with the processing chamber such as a fluid channel or a goods transfer channel.

[2] Description of the Related Art

In Patent Literatures Japanese Unexamined Patent Application Publication No. 2002-195424 and Japanese Unexamined Patent Application Publication No. 2005-291221, a gate valve connected to a processing chamber of a semiconductor manufacturing apparatus or the like and configured to open and close a communicating channel communicating with the processing chamber with a valve plate provided in the interior of the valve box is disclosed. In such a gate valve, since a seal member of the valve plate is subject to damage due to a corrosive fluid such as process gas or the like flowing in the communicating channel, replacement of the seal member with a new one is required as needed.

In order to facilitate the replacement of the seal member, in the gate valve described in Patent Literatures JP No. 2002-195424A and JP No. 2005-291221A, an upper end of the valve box, that is, a surface of the valve box on the side opposite from a side where a valve rod for causing the valve plate to open and close is introduced is opened to allow the valve plate to be taken out therethrough, is provided with a plate-shaped lid member for allowing the opening to be opened and closed thereby. In addition, by opening the lid member, the valve plate at a tip end of the valve rod is allowed to be demounted from the side of the opening, whereby the valve plate can be taken out easily from the valve box.

However, the mounting and demounting structure of the valve plate with respect to the valve rod is limited to a range which allows easy mounting and demounting operation through the opening at the upper end of the valve box. Therefore, it is difficult to mount the valve plate stably to the tip end of the valve rod, or there are various problems as described below.

For example, in the gate valve disclosed in Patent Literature JP No. 2002-195424A, a projecting portion of a leaf spring member mounted on the valve rod is engaged with an opening portion of the valve plate, and the valve plate is fastened to the valve rod by a resilient force of the leaf spring member (FIG. 4 and FIG. 5 in the same Literature JP No. 2002-195424A), or an inclined surface is provided on a mounting potion at the tip end of the valve rod to be mounted in the hole portion of the valve plate and a wedge member to be engaged with the inclined surface and an inner side surface of the valve plate is fixed to the tip end of the valve rod by tightening a screw member (FIG. 8 and FIG. 9 of the same Literature JP No. 2002-195424A).

In the configuration shown in FIG. 4 and FIG. 5 of the above-described Literature, mounting and demounting of the valve plate is easy. In contrast, since the fixation is achieved by the resilient force of the leaf spring, the leaf spring member may be deformed and cause dust when the seal member (O-ring) of the valve plate is secured to a valve seat or the valve plate may come apart from the valve rod, while in the configuration shown in FIG. 8 and FIG. 9 of the above-described literature, since the fixation is achieved only at the tip end of the valve rod, the valve plate might be mounted in an inclined position, so that the valve plate cannot necessarily be fixed stably so as to oppose accurately with respect to the communicating channel of the valve box.

Furthermore, although the gate valve of the above-described Patent Literature JP No. 2005-291221A includes a radial bearing portion and a rotational angle limiting portion at a connecting portion at the tip end of the valve rod to be inserted into a plug receipt of the valve plate, and is configured in such a manner that the radial bearing portion described above allows the valve plate to rotate with respect to the valve rod and to be deformed so as to follow the shape of a valve seat when the valve plate is pressed against the valve seat, and the rotational angle limiting portion limits the rotation allowed in the radial bearing portion to fall within a predetermined angular range. This configuration, however, cannot fix the valve plate stably so as to oppose accurately with respect to the communicating channel of the valve box.

BRIEF SUMMARY OF THE INVENTION

The valve plate is desired to be fixed firmly to the valve rod in an adequate posture. However, it does not means that high-strength fixing means formed by a highly accurate processing is desired, but means that employment of means which can fix the valve plate firmly in a posture as adequate as possible within a range which allows mounting and demounting operation easily from the opening at the upper end of the valve box, which achieves easy mounting of the valve plate in a stable posture while avoiding the problem of generation of dust or the like, is required.

A technical subject of the present invention is to provide a configuration which satisfies above-described requirements relating to a gate valve that opens and closes the communicating channel of the valve box communicating with the processing chamber with the valve plate and, more specifically, to provide a gate valve which fixes the base side and the tip side of the valve plate mounting portion of the valve rod firmly in a simple mounting structure using a wedge effect or the like, and stabilizes the posture of the valve plate by bringing the joint flat surfaces of the valve plate and the valve rod facing each other strongly into tight contact with each other.

In order to solve the above-described problem, according to the present invention, there is provided a gate valve including: a valve box having a communicating hole communicating with a processing chamber; and a valve plate mounted on a valve plate mounting portion at a tip end of a valve rod and accommodated in the valve box, and configured to open and close the communicating hole by bringing a seal member into and out of contact with the periphery of the communicating hole; a valve rod configured to displace the valve plate to a position to open and close the communicating hole; a coupling plate configured to couple the valve plate and the valve rod; an opening formed on the valve box for taking out the valve plate; and a lid member detachably mounted so as to cover the opening.

In the gate valve described above, the valve plate includes a mounting hole which allows insertion of the valve plate mounting portion of the valve rod, and joint flat surfaces which are brought into press-contact with each other when the valve plate and the valve rod are coupled with the coupling plate are formed on the hole surface of the mounting hole and the outer surface of the valve plate mounting portion, respectively. The valve rod includes a depressed-shaped joint shoulder portion which allows fitting of the base side end portion of the valve plate at a position on the side of the base end of the valve plate mounting portion, and the joint shoulder is formed with an inclined surface with which the base side end portion of the valve plate comes into abutment, and the inclined surface causes the valve plate to displace in the direction in which the joint flat surfaces of the valve plate and the valve rod come into press-contact with each other by the wedge effect. The coupling plate couples the valve plate and the valve rod with each other in a state of pressing the valve plate toward the base end side of the valve plate mounting portion.

In the present invention, preferably, the inclined surface of the joint shoulder portion is a flat surface intersecting the joint flat surface of the valve rod at an acute angle, and a portion of the base-side end portion of the valve plate coming into abutment with the inclined surface is formed with an abutting surface parallel to the inclined surface.

In the present invention, the coupling plate includes: a first plate portion to be fixed to the valve plate and a second plate portion to be fixed to the valve plate mounting portion of the valve rod, the tip end surface of the valve plate mounting portion of the valve rod is located at a position retracted into the mounting hole with respect to the tip-side end surface of the valve plate, the first plate portion of the coupling plate is fixed to the tip-side end surface of the valve plate with a screw and the second plate portion is fixed to the tip end surface of the valve plate mounting portion with a screw, so that the valve plate is pressed toward the base end side of the valve plate mounting portion.

In the gate valve having the configuration as described above, when the valve plate is taken out from an opening of the valve box for the replacement of the seal member, the valve plate can be demounted from the valve plate mounting portion on the tip end side of the valve rod together with the coupling plate and taken out the same from the valve box through the opening by demounting the lid member at the opening and loosening the screw which fixes the valve rod and the coupling plate.

Also, when the valve plate is mounted on the tip end portion of the valve rod, the valve plate is accommodated in the valve box so that the valve plate mounting portion of the valve rod is inserted into the mounting hole of the valve plate with the both joint flat surfaces of the valve rod and the valve plate facing each other in a state in which the coupling plate is fixed to the tip-side end surface of the valve plate with the screw. At this time, the joint flat surfaces of the valve rod and the valve plate are mated with each other, the base side end portion of the valve plate is pushed into the joint shoulder portion on the side of the base end of the valve plate mounting portion of the valve rod to achieve a state in which the joint flat surfaces of the valve rod and the valve plate are in strong press-contact with each other by the wedge effect caused by the inclined surface, and the coupling plate fixed to the valve plate with a screw is also fixed to a tip end portion of the valve rod with a screw, whereby the valve rod and the valve plate can firmly be coupled.

At this time, with the provision of the press-contact mechanism to the coupling plate, as described below in detail, the both joint flat surfaces on the tip end sides of the valve plate and the valve rod can be brought into strong press-contact with each other.

According to a first example of the press-contact mechanism, the press-contact mechanism includes an inclined portion which comes into abutment with the end portion of the valve plate mounting portion of the valve rod at an end portion of the second plate portion, and the inclined portion generates a component force in the direction in which the joint flat surfaced of the valve plate and the valve rod are brought into press-contact with each other. In this case, an inclined portion parallel to the inclined portion is formed at an end portion of the valve plate mounting portion with which the inclined portion of the second plate portion comes into abutment.

Then, when the coupling plate is fixed to the tip end portion of the valve rod with a screw and the inclined portion is pressed against the valve rod, the valve rod is brought into press-contact with the valve plate side by the component force caused by the wedge effect, and hence the joint flat surfaces of the valve plate and the valve rod are brought into press-contact with each other further strongly.

Therefore, the valve rod and the valve plate can achieve firm fixation between the joint flat surfaces on the base end side and the tip end side of the valve plate mounting portion of the valve rod with a simple mounting structure using the wedge effect.

As a second example of the press-contact mechanism, a configuration including a freely bendable resilient bent portion formed at an intermediate portion of the second plate portion and a tip end engaging portion formed at a tip end portion of the second plate portion to engage the valve rod, and the resilient bent portion is expanded when the second plate portion is fixed to the valve rod with a screw, whereby the joint flat surfaces of the valve plate and the valve rod are brought into press-contact with each other is also applicable.

In the second press-contact mechanism, when the intermediate portion of the second plate portion of the coupling plate is fixed to the tip end portion of the valve rod with the screw, the resilient bent portion expands, and an expanding force thereof brings the tip end portion of the valve rod into press-contact with the inner surface of the valve plate, so that the joint flat surfaces are strongly brought into press-contact on the base end side and the tip end side of the valve plate mounting portion of the valve rod so that the fixation is achieved in the same manner as the case of the first press-contact mechanism.

In the present invention, preferably, an insertion hole formed on the second plate portion of the coupling plate has a dimensional allowance which can absorb a relative displacement between the second plate portions and the valve rod when fixing the second plate portions to the valve rod with a screw.

According to the gate valve of the present invention, there is provided a gate valve which fixes the base side and the tip side of the valve plate mounting portion of the valve rod firmly in a simple mounting structure using the wedge effect or the like, and stabilizes the posture of the valve plate by bringing the joint flat surfaces of the valve plate and the valve rod opposing to each other strongly into tight contact with each other.

DETAILED DESCRIPTION OF THE INVENTION

Figure 1:
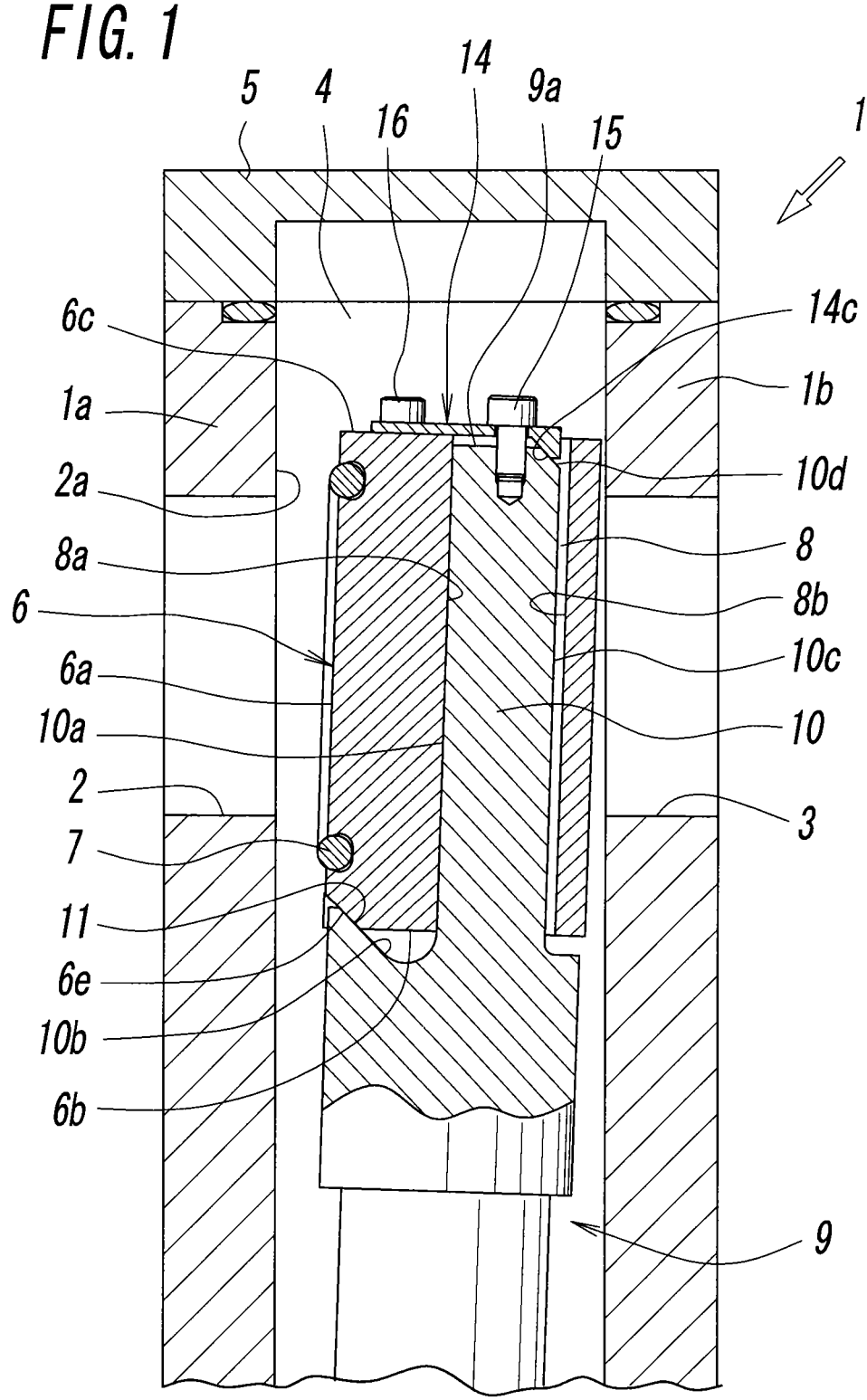
FIG. 1 is a cross-sectional view of a principal portion showing a basic configuration of Example 1 of a gate valve according to the present invention.
Figure 2:
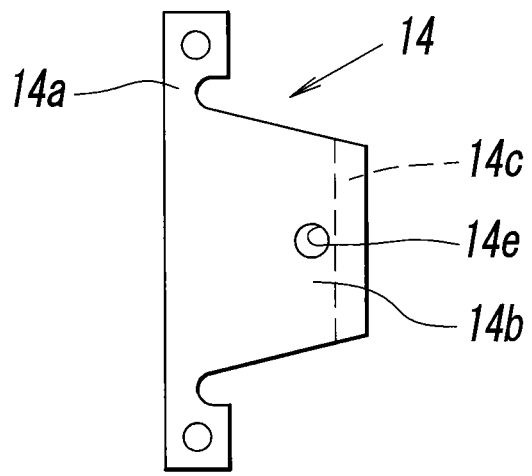
FIG. 2 is a plan view of a coupling plate in Example 1 described above.
Figure 3:
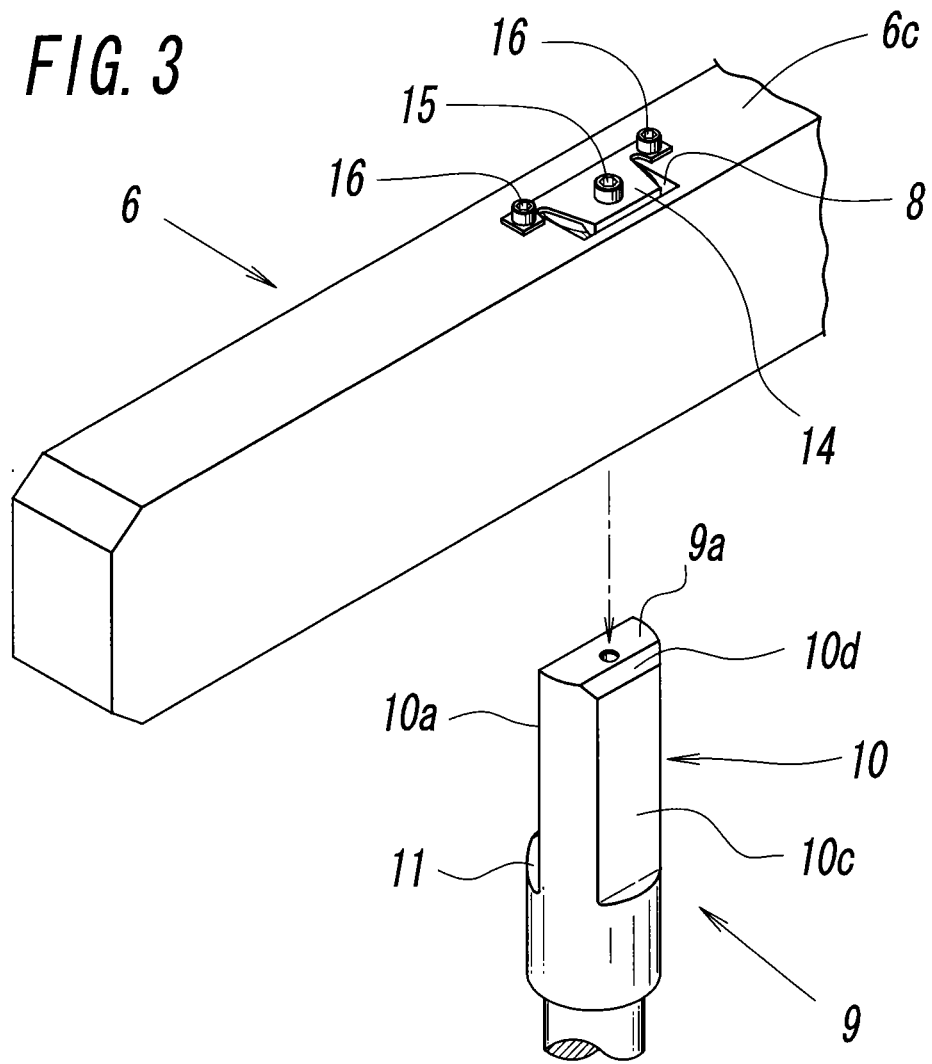
FIG. 3 is an exploded perspective view of the principal portion of Example 1 described above.

FIG. 1 to FIG. 3 show Example 1 of a gate valve according to the present invention. This gate valve is configured to be used by being connected to a processing chamber or the like in a semiconductor manufacturing apparatus or the like, includes a communicating hole 2 communicating with the processing chamber or the like on a front wall 1a of a valve box 1, and a seal member (O-ring) 7 disposed in the valve box 1 and configured to come into and out of contact with a valve seat portion 2a around the communicating hole 2 on a seal surface 6a on the front surface of a valve plate 6 which opens and closes the communicating hole 2.

The valve plate 6 is mounted so as to be mountable and demountable with respect to a valve plate mounting portion 10 formed at the tip end of a valve rod 9, and the valve rod 9 is driven by a drive mechanism, not shown, and displaces the valve plate 6 to positions to open and close the communicating hole 2. More specifically, the valve rod 9 is formed into a column shape and, when the tip end portion thereof is introduced into the valve box 1 through a bottom wall of the valve box 1 and is driven by the driving mechanism, the valve rod 9 is tilted from a closing position where valve seat portion 2a around the communicating hole 2 opened through the front wall 1a of the valve box 1 is sealed by a seal member 7 of the valve plate 6 to a retracted position where the seal member 7 of the valve plate 6 is moved out of contact from the valve seat portion 2a but the valve plate 6 opposes the communicating hole 2 as shown in FIG. 1, and then is displaced to an opened position where the valve plate 6 is completely apart from the communicating hole 2 which is a position below the position shown in FIG. 1. For reference, the drive mechanism of this type is generally well known in the related art, further detailed description will be omitted.

Also, the valve box 1 includes a communicating hole 3 opposing the communicating hole 2 of the front wall 1a on a rear wall 1b facing the front wall 1a, whereby a channel linearly connected to other chambers or fluid devices or the like from the communicating hole 2 of the front wall 1a through the communicating hole 3 of the rear wall 1b is formed. Furthermore, an opening 4 which allows the valve plate 6 to be demounted from the valve rod 9 and taken out to the outside is formed on an upper surface of the valve box 1, that is, a surface opposite from the side where the valve rod 9 is introduced into the valve box 1, and a plate-shaped lid member 5 is covered on the opening 4 so as to be openable and closable.

In order to mount the valve plate 6 on the valve plate mounting portion 10 on the tip end side of the valve rod 9, the valve plate 6 is formed with a mounting hole 8 which allows insertion of the valve plate mounting portion 10 therethrough so as to penetrate through the valve plate 6 in the vertical direction of the drawing. The mounting hole 8 is a hole having a rectangular shape in cross-section and includes front and rear hole surfaces 8a, 8b parallel to each other, and a front hole surface, that is, a hole surface 8a which faces the opposite direction from the seal surface 6a is a joint flat surface 8a which comes into abutment with the joint flat surface 10a of the valve plate mounting portion 10.

In contrast, the valve plate mounting portion 10 at the tip end of the valve rod 9 is a portion flattened by cutting off the tip end portion of the column-shaped valve rod 9 along two flat surfaces 10a, 10c parallel to the front wall 1a of the valve box 1 and also parallel to each other as shown in FIG. 1 and FIG. 3, and a flat surface facing the front from between the two joint flat surfaces 10a, 10c, that is, the joint flat surface 10a facing the communicating hole 2 side is formed as the joint flat surface 10a which comes into tight abutment with the joint flat surface 8a of the mounting hole 8 of the valve plate 6.

When the valve plate mounting portion 10 is inserted into the mounting hole 8 of the valve plate 6, the tip end surface 9a of the valve plate mounting portion 10 does not project out from the mounting hole 8, but comes to a position slightly retracted inwardly of the mounting hole 8 with respect to the tip-side end surface 6c of the valve plate 6.

Then, formed at a position of the valve rod 9 on the base side of the valve plate mounting portion 10 is a depressed-shaped joint shoulder portion 10b having an inclined surface 11. By fitting the base-side end portion 6b of the valve plate 6 to the joint shoulder portion 10b and bringing an inclined abutting surface 6e of the base-side end portion 6b into press-contact with the inclined surface 11 by pressing the valve plate 6 downward, the valve plate 6 is coupled to the valve rod 9 in a state in which the joint flat surface 8a of the valve plate 6 and the joint flat surface 10a of the valve rod 9 are brought into press-contact with each other by a wedge effect.

The inclined surface 11 is a flat surface inclining in the direction approaching the joint flat surface 10a gradually toward the base end side of the valve rod 9 and is configured generally as a single inclined flat surface intersecting the joint flat surface 10a at an acute angle (preferably 45°). However, the inclined surface 11 is not limited thereto, and may be formed into a shape and at an angle with which a component force of a pressing force generated when the base-side end portion 6b of the valve plate 6 is pressed against the joint shoulder portion 10b of the valve rod 9 causes the joint flat surfaces 8a, 10a of the valve plate 6 and the valve rod 9 to be brought into press-contact with each other.

Also, a coupling plate 14 is provided in order to fix the valve plate 6 and the valve rod 9 with each other. The coupling plate 14 has a convex shape in plan view having a first plate portion 14a to be fixed to the tip-side end surface 6c of the valve plate 6 and a second plate portion 14b to be fixed to the tip end surface 9a of the valve rod 9 integrally with each other as shown in FIG. 2, and configured to couple the valve plate 6 and the valve rod 9 with each other by fixing the first plate portion 14a and second plate portion 14b respectively to the tip-side end surface 6c of the valve plate 6 and the tip end surface 9a of the valve rod 9 with the screws 16, 15. The coupling plate 14 preferably is formed of a metal and has a resiliency. By mounting the coupling plate 14 described above, the valve plate 6 is pressed downward (toward the base end of the valve rod), and the base-side end portion 6b is pushed into the joint shoulder portion 10b of the valve rod 9 and, simultaneously, the valve plate 6 is pressed toward the joint flat surface 10a of the valve plate mounting portion 10 by the press-contact mechanism provided on the coupling plate 14, so that the valve plate 6 and the valve rod 9 are coupled in a state in which the joint flat surfaces 8a, 10a are in press-contact with each other.

As the press-contact mechanism described above, in Example 1, described above, an inclined portion 14c is formed on a lower surface of a tip end portion of the second plate portion 14b of the coupling plate 14, and an inclined portion 10d facing an inclined portion 14c is formed on an upper end portion of a flat surface 10c facing the direction opposite from the joint flat surface 10a of the valve rod 9. The inclined portions 14c, 10d are preferably parallel to the abutting surface 6e and the inclined surface 11. In this configuration, when the coupling plate 14 is fixed to the valve plate 6 and the valve rod 9 with screws 16, 15, the inclined portion 14c of the coupling plate 14 and the inclined portion 10d of the valve rod 9 are brought into press-contact with each other, and a component force in the direction which brings the joint flat surfaces 8a, 10a of the valve plate 6 and the valve rod 9 into press-contact with each other is generated, whereby the valve plate 6 and the valve rod 9 are brought into press-contact with each other also on the tip end side of the joint flat surfaces 8a, 10a.

Figure 4:
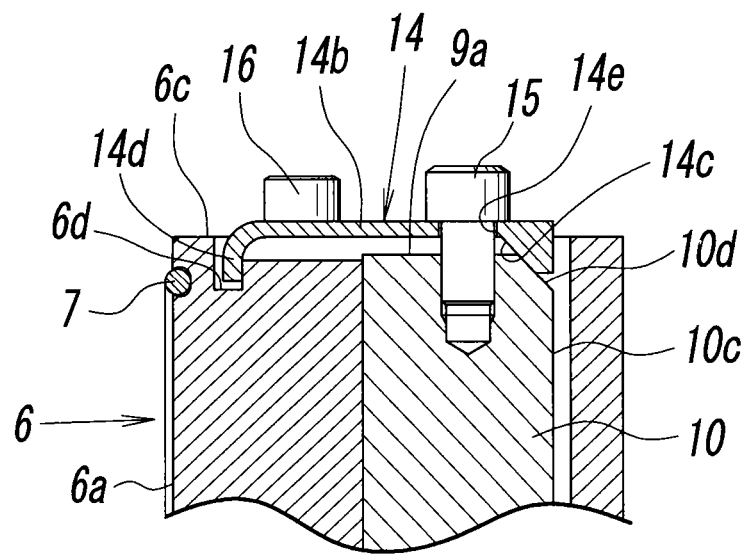
FIG. 4 is a cross-sectional view of a principal portion showing a modification of Example 1 described above.

The configuration of the coupling plate 14 is not limited to that in Example 1 and, for example, a configuration of a modification as shown in FIG. 4 may also be employed. The modification in the same drawing is different from Example 1 in that a bent portion 14d configured to engage a depressed groove 6d provided on the tip-side end surface 6c of the valve plate 6 is provided at an end portion of the coupling plate 14 on the side of the seal surface 6a of the valve plate 6. The bent portion 14d is formed at an intermediate portion of the first plate portion 14a except for portions at both ends of the first plate portion 14a where two screws 16 are attached.

In the coupling plate 14 in Example 1 and in the modification, since a relative displacement is generated between the coupling plate 14 an the tip end surface 9a when fixing the coupling plate 14 to the tip end surface 9a of the valve rod 9 with the screw 15 inserted into the insertion hole 14e, the insertion hole 14e located on the second plate portion 14b of the coupling plate 14 preferably has a dimensional allowance which can absorb the relative displacement between the coupling plate 14 and the tip end surface 9a of the valve rod 9 by a method of forming the hole having a diameter sufficiently larger than the diameter of the screw 15 described above, by a method of forming the hole into an elongated hole, or the like.

Other configurations and the actions of the modification are not different from the case in Example 1, the description will be omitted.

In the gate valve having the configuration as described above, when the valve plate 6 is taken out from the valve box 1 for the replacement of the seal member 7, the lid member 5 of the valve box 1 is demounted and the second plate portion 14b of the coupling plate 14 is demounted from the valve rod 9 by loosening only the screw 15 which fixes the second plate portion 14b of the coupling plate 14 to the tip end surface 9a of the valve rod 9, so that the valve plate 6 can be demounted from the valve plate mounting portion 10 on the tip end side of the valve rod 9 together with the coupling plate 14 and can be taken out through the opening 4 of the valve box 1.

Also, when the valve plate 6 is mounted on the tip end surface 9a of the valve rod 9, as shown in FIG. 3, the valve plate 6 is accommodated in the valve box 1 so that the valve plate mounting portion 10 of the valve rod 9 is inserted into the mounting hole 8 of the valve plate 6 with the valve plate 6 oriented in the direction where the joint flat surfaces 8a, 10a of the valve plate 6 and the valve rod 9 face each other in a state in which the coupling plate 14 is fixed to the tip-side end surface 6c with the screw 16. Then, as shown in FIG. 1, the base-side end portion 6b of the valve plate 6 is fitted into the joint shoulder portion 10b on the tip end side of the valve plate mounting portion 10 of the valve rod 9, and the abutting surface 6e at the base end of the valve plate 6 is brought into abutment with the inclined surface 11 of the joint shoulder portion 10b in a state in which the joint flat surfaces 8a, 10a of the valve plate 6 and the valve rod 9 are mated with each other and, in this state, the coupling plate 14 fixed to the valve plate 6 with the screw 16 is fixed to the tip end surface 9a of the valve rod 9 with the screw 15. Accordingly, the valve plate 6 is pressed downward and hence the abutting surface 6e is brought into press-contact with the inclined surface 11, and simultaneously, the valve plate 6 is pressed toward the joint flat surface 10a side of the valve plate mounting portion 10 by the press-contact mechanism including the inclined portion 14c of the coupling plate 14 and the inclined portion 10d of the valve rod 9, so that the valve plate 6 is firmly fixed to the valve rod 9 in a state in which the joint flat surfaces 8a, 10a of the valve plate 6 and the valve rod 9 are strongly in press-contact with each other.

Figure 5:
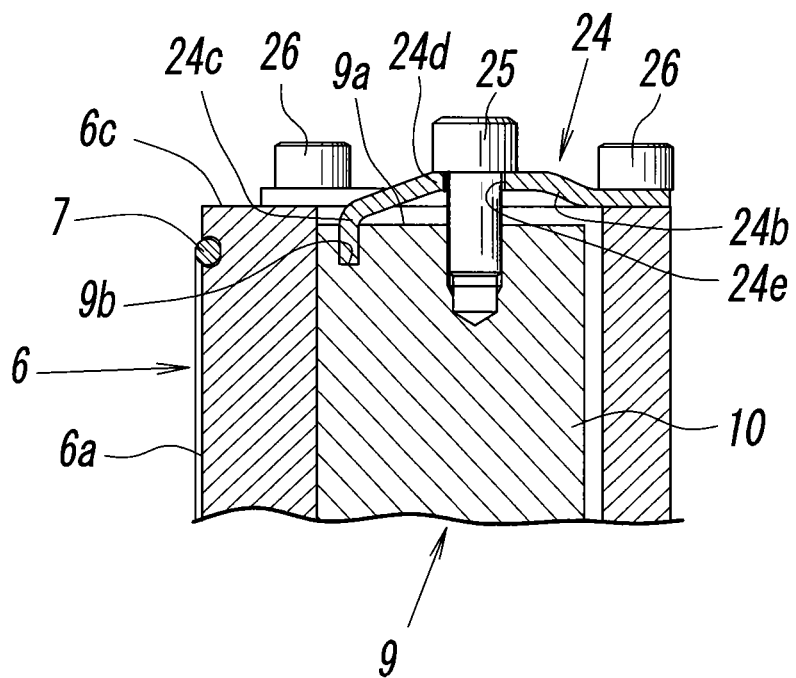
FIG. 5 is a cross-sectional view of a principal portion in Example 2 of the gate valve according to the present invention.
Figure 6:
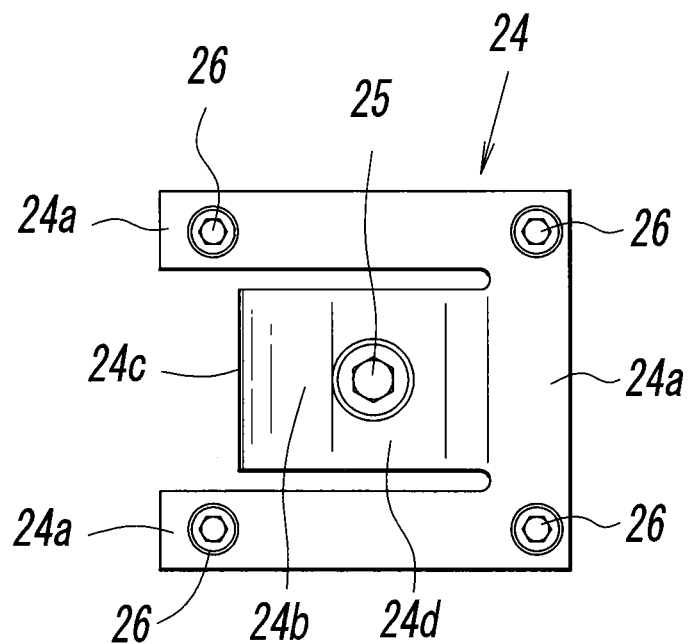
FIG. 6 is a plan view of a coupling plate in Example 2 described above.

As the press-contact mechanism described above, a configuration other than Example 1 described above may be employed. FIG. 5 and FIG. 6 show principal portion of the gate valve according to Example 2 in which the configuration of the press-contact mechanism is different. This gate valve includes a coupling plate 24 as shown in FIG. 6 fixed to the tip-side end surface 6c of the valve plate 6 with the screw 26. The coupling plate 24 includes a first plate portion 24a for being fixed to the valve plate 6 formed into a concave shape in plan view, and a second plate portion 24b for being fixed to the valve rod 9 so as to project in the concave portion from part of the first plate portion 24a in the direction of the seal surface 6a of the valve plate 6 along the tip end surface 9a of the valve rod 9, and is formed integrally of a metal plate having a resiliency as a whole.

The second plate portion 24b is formed into a leaf spring shape by providing a resilient bent portion 24d which project upward and is resiliently expandable at an intermediate portion, and includes a tip end engaging portion 24c configured to engage a depressed groove 9b of the tip end surface 9a of the valve rod 9 at the tip end portion thereof, so that the resilient bent portion 24d is expanded to a flat shape or an almost flat shape when the second plate portion 24b is fixed to the tip end surface 9a of the valve rod 9 with a screw 25 inserted through the insertion hole 24e. The press-contact mechanism is formed of the second plate portion 24b. The insertion hole 24e has a dimensional allowance which can absorb the relative displacement between the second plate portion 24b and the tip end surface 9a of the valve rod 9 when the second plate portion 24b is fixed to the tip end surface 9a of the valve rod 9 with the screw 25.

The coupling plate 24 is configured in such a manner that the resilient bent portion 24d expands linearly when the second plate portion 24b is fixed to the tip end surface 9a of the valve rod 9 with a screw 25 at a position of the resilient bent portion 24d and applies a force in the direction to bring the joint flat surfaces 8a, 10a of the valve plate 6 and the valve rod 9 by the expanding force thereof, so that the joint flat surfaces 8a, 10a of the valve plate 6 and eth valve rod 9 are brought into press-contact with each other by screw fixation of the second plate portion 24b of the coupling plate 24 with respect to the tip end surface 9a of the valve rod 9. Therefore, the valve rod 9 and the valve plate 6 can achieve firm fixation between the joint flat surfaces 8a, 10a on the base end side and the tip end side of the valve plate mounting portion 10 of the valve rod 9 in a simple mounting structure. Other configurations and actions in Example 2 have no different point from Example 1.

The invention claimed is:

1. A gate valve comprising:
    a valve box having a communicating hole communicating with a processing chamber;
    a valve plate mounted on a valve plate mounting portion at a tip end of a valve rod and accommodated in the valve box, the valve plate being configured to open and close the communicating hole by bringing a seal member into and out of contact with a periphery of the communicating hole;
    a valve rod configured to displace the valve plate to a position to open and close the communicating hole;
    a coupling plate coupling the valve plate and the valve rod;
    an opening formed on the valve box for taking out the valve plate; and a detachable lid member configured to cover the opening, wherein the valve plate includes a mounting hole which allows insertion of the valve plate mounting portion of the valve rod, and joint flat surfaces of the valve plate and the valve rod which are brought into press-contact with each other when coupling the valve plate and the valve rod with the coupling plate, are formed on a hole surface of the mounting hole and an outer surface of the valve plate mounting portion respectively, the valve rod includes a depressed-shaped joint shoulder portion which allows fitting of a base-side end portion of the valve plate at a position on a base side of the valve plate mounting portion, the joint shoulder portion is formed with an inclined surface which allows abutment of a base-end-side end portion of the valve plate, the inclined surface displaces the valve plate in the direction in which the joint flat surfaces of the valve plate and the valve rod are brought into press-contact with each other by a wedge effect, and the coupling plate couples the valve plate and the valve rod with each other in a state in which the valve plate is pressed toward a base end side of the valve plate mounting portion.

2. The gate valve according to claim 1, wherein the inclined surface of the joint shoulder portion of the valve rod is a flat surface intersecting the joint flat surface of the valve rod at an acute angle.

3. The gate valve according to claim 2, wherein an abutting surface parallel to the inclined surface of the joint shoulder portion of the valve rod is formed on a portion which abuts on an inclined surface of the base-end-side end portion of the valve plate.

4. The gate valve according to claim 1, wherein an abutting surface parallel to the inclined surface of the joint shoulder portion of the valve rod is formed on a portion which abuts on an inclined surface of the base-end-side end portion of the valve plate.

5. The gate valve according to claim 4, wherein the coupling plate includes: a first plate portion to be fixed to the valve plate and a second plate portion to be fixed to the valve plate mounting portion of the valve rod, a tip end surface of the valve plate mounting portion of the valve rod is located at a position retracted into the mounting hole with respect to a tip-side end surface of the valve plate, the first plate portion of the coupling plate is fixed to the tip-side end surface of the valve plate with a screw and the second plate portion is fixed to the tip end surface of the valve plate mounting portion with a screw, so that the valve plate is pressed toward the base end side of the valve plate mounting portion.

6. The gate valve according to claim 5, wherein the coupling plate includes a press-contact mechanism configured to press the valve plate in the direction in which the joint flat surfaces of the valve plate and the valve rod are brought into press-contact with each other.

7. The gate valve according to claim 6, wherein the press-contact mechanism includes an inclined portion which comes into abutment with an end portion of the valve plate mounting portion of the valve rod at an end portion of the second plate portion, and the inclined portion generates a component force in the direction in which the joint flat surfaces of the valve plate and the valve rod are brought into press-contact with each other.

8. The gate valve according to claim 7, wherein an inclined portion parallel to the inclined portion is formed at the end portion of the valve plate mounting portion with which the inclined portion of the second plate portion comes into abutment.

9. The gate valve according to claim 6, wherein the press-contact mechanism includes a freely bendable resilient bent portion formed at an intermediate portion of the second plate portion and a tip end engaging portion formed at a tip end portion of the second plate portion to engage the valve rod and the resilient bent portion is expanded when the second plate portion is fixed to the valve rod with a screw, whereby the joint flat surface of the valve plate and the valve rod are brought into press-contact with each other.

10. The gate valve according to claim 1, wherein the coupling plate includes: a first plate portion to be fixed to the valve plate and a second plate portion to be fixed to the valve plate mounting portion of the valve rod, a tip end surface of the valve plate mounting portion of the valve rod is located at a position retracted into the mounting hole with respect to a tip-side end surface of the valve plate, the first plate portion of the coupling plate is fixed to the tip-side end surface of the valve plate with a screw and the second plate portion is fixed to the tip end surface of the valve plate mounting portion with a screw, so that the valve plate is pressed toward the base end side of the valve plate mounting portion.

11. The gate valve according to claim 10, wherein the coupling plate includes a press-contact mechanism configured to press the valve plate in the direction in which the joint flat surfaces of the valve plate and the valve rod are brought into press-contact with each other.

12. The gate valve according to claim 11, wherein the press-contact mechanism includes an inclined portion which comes into abutment with an end portion of the valve plate mounting portion of the valve rod at an end portion of the second plate portion, and the inclined portion generates a component force in the direction in which the joint flat surfaces of the valve plate and the valve rod are brought into press-contact with each other.

13. The gate valve according to claim 12, wherein an inclined portion parallel to the inclined portion is formed at the end portion of the valve plate mounting portion with which the inclined portion of the second plate portion comes into abutment.

14. The gate valve according to claim 12, wherein an insertion hole formed on the second plate portion of the coupling plate has a dimensional allowance absorbing a relative displacement between the second plate portions and the valve rod when fixing the second plate portions to the valve rod with the screw.

15. The gate valve according to claim 11, wherein the press-contact mechanism includes a freely bendable resilient bent portion formed at an intermediate portion of the second plate portion and a tip end engaging portion formed at a tip end portion of the second plate portion to engage the valve rod and the resilient bent portion is expanded when the second plate portion is fixed to the valve rod with a screw, whereby the joint flat surface of the valve plate and the valve rod are brought into press-contact with each other.

16. The gate valve according to claim 15, wherein an insertion hole formed on the second plate portion of the coupling plate has a dimensional allowance absorbing a relative displacement between the second plate portions and the valve rod when fixing the second plate portions to the valve rod with the screw.

* * * * *